F. L. O. WADSWORTH.
MANUFACTURE OF VEHICLE TIRES.
APPLICATION FILED OCT. 17, 1911.

1,111,418.

Patented Sept. 22, 1914.

WITNESSES
W. C. Lyon
E. L. Hyde

INVENTOR
Frank L. O. Wadsworth
By Fredk. N. Winter,
Attorney

UNITED STATES PATENT OFFICE.

FRANK L. O. WADSWORTH, OF SEWICKLEY, PENNSYLVANIA.

MANUFACTURE OF VEHICLE-TIRES.

1,111,418. Specification of Letters Patent. Patented Sept. 22, 1914.

Application filed October 17, 1911. Serial No. 655,237.

*To all whom it may concern:*

Be it known that I, FRANK L. O. WADSWORTH, a resident of Sewickley, in the county of Allegheny and State of Pennsylvania, have invented certain new and useful Improvements in the Manufacture of Vehicle-Tires, of which the following is a specification.

My invention relates to the construction of composite anti-slipping vehicle tires composed in part of rubber or other analogous material and in part of wire spirals embedded or partially embedded therein; and the object of my invention is to simplify the construction of this type of tire, to decrease the difficulty of embedding the wire elements in the tread material, to reduce the cost of manufacture, and to secure a finished structure in which there will be no cavities and in which all parts of the tread material will be of substantially the same density. I accomplish these objects by first filling each of the wire spirals with the tread material so as to obtain a series of solid composite cylinders of wire and rubber which may be readily handled as individual units, and may be embedded in the body of the tread with very much less difficulty than is encountered in the embedding of open wire spirals.

Figure 1:
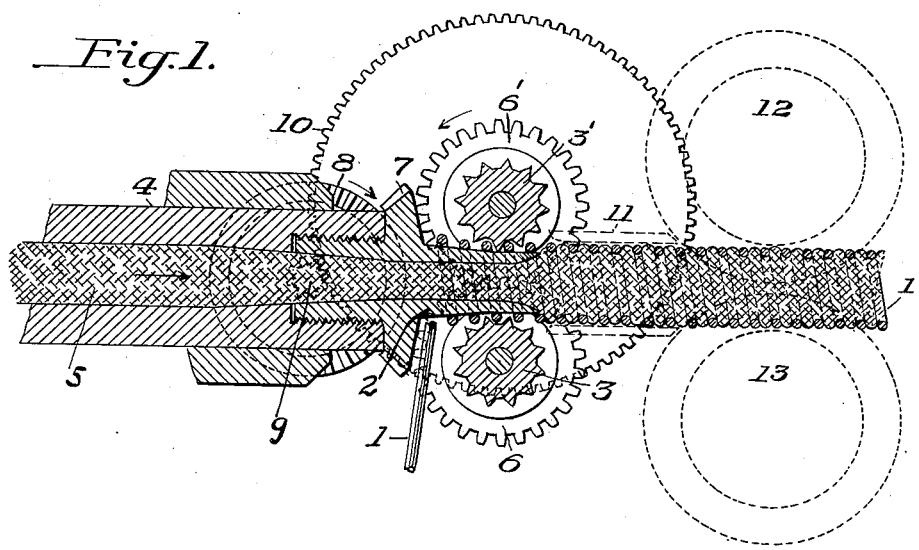
Figure 2:
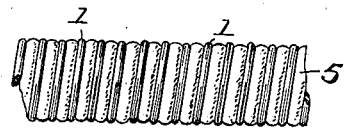

In the drawings which form a part of this specification Figure 1 illustrates in cross-section the general process of forming a wire spiral and simultaneously filling it with the tread material; Fig. 2 is a view of a short section of the composite rubber-wire cylinder thus obtained; and Fig. 3 is a cross-section of a completed automobile tire containing four of my composite wire-rubber cylinders embedded in the body of the tread material.

Like figures indicate the same parts in all of the drawings.

In Fig. 1, 1 indicates a wire of any desired cross-section which is wound on the rotating head 2, and is fed therefrom in a continuous spiral by means of two positively driven spur wheels, 3, 3'. The head 2 and the driving shaft 4 on which it is mounted, are made hollow, and the end of the driving shaft communicates with a reservoir (not shown) containing the raw rubber or other plastic tread material; and as the wire spiral is formed and fed from the head it is filled with this plastic tread material 5, by forcing the latter out of the reservoir through the hollow shaft 4 and head 2 by means of a screw operated plunger or any other suitable device (not shown). In order to obtain a definite and accurate spacing of the wire coils I connect the feed wheels 3, 3' by means of gears 6, 6' and drive these gears from the rotating head 2 at such a speed that the said feed wheels 3, 3' move through a space of one tooth for every complete revolution of the head 2. In the construction shown in Fig. 1, this is accomplished by means of a miter gear 7 on the head 2 which meshes with a second miter gear 8 connected with a pinion 9 (shown in dotted line) engaging a spur gear 10 secured to the gear 6. The inner end of the winding head 2—*i. e.*, the end adjacent to the miter gear 7—is milled or knurled longitudinally (so as to give it a good grip on the wire) and is slightly tapered so as to provide for the circumferential or radial contraction of the wire spirals as they are opened up and fed off from the outer end of said head by the action of the toothed wheels 3 3'. If desired a hollow tube 11 (shown in dotted lines) may be placed in front of the rotating head 2 to receive the composite rubber-wire cylinder and guide it away from the point of formation. In some cases I may also employ two grooved feeding and molding wheels 12 and 13 (indicated diagrammatically in dotted lines) to assist in drawing away the cylinder and giving it its final desired form. When these wheels are used they are mounted on a frame which rotates about the axis of the coil at the same angular speed as the head 2; the spur gear 10 being spaced far enough to one side of the apparatus to permit of such rotation without interference. By giving these wheels 12 and 13 a mean circumferential speed a little greater or a little less than the speed of delivery of the feed wheels 3, 3' the cylinder may be either slightly stretched or slightly compressed longitudinally after it leaves the forming head 2.

Figure 3:
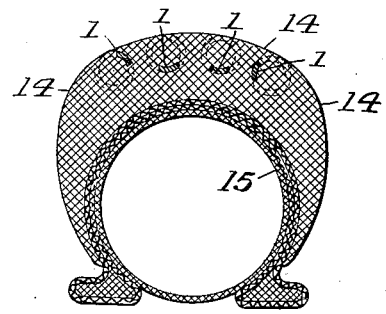

The composite cylinder thus obtained—a short length of which is shown in Fig. 2—may be then subjected to a curing or vulcanizing operation, and stored away for subsequent use in the formation of the completed tire; or the cylinder may be used at once in the building up of the completed structure shown in Fig. 3. In either case the solid composite cylinders are in such form that they may be readily handled in the assembly of the tire parts, and may be used much more conveniently in the process of such assembly than the open unfilled wire spirals can be. A further advantage which is secured by filling the wire spirals prior to their introduction to the body of the tread material is that such preliminary filling avoids all of the difficulties usually experienced in forcing the body of the tread material into and around the wire and thereby avoids all danger of leaving open spaces within the metal coils. In the building up or assembling of the parts it is only necessary to lay these solid composite wire-rubber cylinders in place in a suitable concave form or mold ring and roll down on top of them a sufficient amount of tread material 14, to surround the cylinders, fill the open spaces between their peripheries and build up the section to the final form required (as in Fig. 3)—an operation which is much more easily and readily performed than one in which it is necessary to simultaneously force the tread material into and between the coils of open wire spirals. The preliminary filling of the wire forms prior to their assembly in the completed structure also makes it possible to use, if desired, much more closely coiled spirals than could be used in the ordinary process of manufacture.

After the parts have been assembled and united as above described the tire or tread is of course finished by cementing it to the canvas base, 15, and subjecting the assembled parts to the usual curing or vulcanizing operations.

The advantages of the method of manufacture above described will now be readily apparent to those skilled in the art, and it is also obvious that such method of manufacture may be carried out with various modifications of the apparatus which has been described. The rotating head 2 on which the wire spiral is wound may, for example, be of circular, or elliptical or ovoidal, or any other desirable cross-section and the teeth of the feed wheels 6, 6' may be arranged at either regular or irregular intervals.

What I claim is:

1. As a step in the manufacture of composite vehicle tires the formation of a solid composite cylinder comprising a core of plastic tread material, surrounded by a spiral or metallic wire.

2. As a step in the manufacture of vehicle tires of the kind described, the preliminary production of composite wire rubber cylinders by forming wire spirals, simultaneously filling said spirals with raw rubber and then subjecting the cylinder to a vulcanizing action.

3. The method of manufacturing composite wire-rubber treads or tires of the kind described which consists in first forming a series of wire spirals, filling said spirals as they are formed with raw plastic rubber, vulcanizing said cylinders, and then embedding them in the body of the tread or tire and shaping the latter to the final form required substantially as described.

4. The method of making tires which comprises the preliminary formation of composite cylinders of tire material surrounded by metal coils and the subsequent embedding of said composite cylinders in the body of the tire.

5. The method of making tires which consists in first forming composite cylinders having a core of plastic tire material surrounded by metal coils and then embedding said cylinders in the body of the tire and shaping the tire to the final form required.

6. The method of making composite wire-rubber tires which consists in first forming a series of wire spirals and filling said spirals with plastic tire material so as to form solid composite cylinders, and then embedding said cylinders in the body of the tire, and shaping it to the final form required.

7. The method of making composite members for tires, consisting in forming a core of plastic material, and enveloping the same with wire during the formation of said core.

8. The method of making composite members for tires, consisting in forming a core of plastic material, and simultaneously bending wire around the same.

9. The method of making composite cylinders for tires, consisting in coiling wire to form a spiral, and simultaneously introducing into the space within said spiral a core of plastic material.

10. The method of making composite cylinders for tires, consisting in coiling wire to form a spiral, and simultaneously forming a core of plastic material and introducing the same into the space within said spiral.

In testimony whereof, I have hereunto set my hand.

FRANK L. O. WADSWORTH.

Witnesses:
F. W. WINTER,
MARY E. CAHOON.